United States Patent [19]

Davies et al.

[11] Patent Number: 5,999,300
[45] Date of Patent: Dec. 7, 1999

[54] HYBRID SINGLE SIDEBAND OPTICAL MODULATOR

[75] Inventors: Robert J. Davies, Calgary; Jan Conradi, Edmonton; David E. Dodds, Saskatoon, all of Canada

[73] Assignee: Telecommunications Research Laboratories, Edmonton, Canada

[21] Appl. No.: 08/873,967

[22] Filed: Jun. 12, 1997

[51] Int. Cl.$^6$ .............................. H04B 10/04; G02F 1/035
[52] U.S. Cl. .......................... 359/183; 359/181; 359/188; 359/279; 385/2; 385/3
[58] Field of Search .................................... 359/183, 181, 359/188, 276, 279; 385/2, 3

[56] References Cited

U.S. PATENT DOCUMENTS

| | | | |
|---|---|---|---|
| 4,933,929 | 6/1990 | Tajima | 370/3 |
| 5,301,058 | 4/1994 | Olshansky | 359/188 |
| 5,420,868 | 5/1995 | Chraplyvy et al. | 370/122 |
| 5,477,375 | 12/1995 | Korotky et al. | 359/264 |
| 5,515,196 | 5/1996 | Kitajima et al. | 359/180 |
| 5,699,179 | 12/1997 | Gopalakrishnan | 359/183 |
| 5,880,870 | 3/1999 | Sieben et al. | 359/181 |

FOREIGN PATENT DOCUMENTS

| | | |
|---|---|---|
| 2-311029 | 12/1990 | Japan . |
| 4-114536 | 4/1992 | Japan . |

OTHER PUBLICATIONS

U.S. application No. 08/738,573, Sieben et al., filed Oct. 28, 1996. Now U.S. 5,880,870, issued Mar 9, 1999.

Young, T., J. Conradi, W. Tinga and B. Davies, "Generation and Transmission of FM and π/4 DQPSK Signals at Microwave Frequencies Using Harmonc Generation and Optoelectronic Mixing in Mach–Zehnder Modulators," *IOOC 95*, pp. 72–73 (Jun. 1995).

Young, T., J. Conradi and W. Tinga, "Generation and Transmission of FM and π/4 DQPSK Signals at Microwave Frequencies Using Harmonic Generation and Optoelectronic Mixing in Mach–Zehnder Modulators," *IEEE Transactions on Microwave Theory and Techniques*, 44:446–453 (Mar. 1996).

Koyama, F. and K. Iga, "Frequency Chirping in External Modulators," *Journal of Lightwave Technology*, 6(1):87–93 Jan. 1988.

Djupsjöbacka, A. and O. Sahlén, "Dispersion Compensation by Differential Time Delay," *IEEE Journal of Lightweight Technology*, 12(10):1849–1853 (Oct. 1994).

Jopson, R.M., A.H. Gnauck and R.M. Derosier, "10 Gb/s 360–km Transmission Over Normal–Dispersion Fiber Using Mid–system Spectral Inversion," *Proceedings OFC '93*, paper PD3–1 (1993).

Gnauk, A.H., S.K. Korotky, J.J. Veselka, J. Nagel, C.T. Kemmerer, W.J. Minford, and D.T. Moser, "Dispersion Penalty Reduction Using an Optical Modulator with Adjustable Chirp," *IEEE Photonics Technology Letters*, 3(10):916–918 (Oct. 1991).

(List continued on next page.)

*Primary Examiner*—Georgia Epps
*Assistant Examiner*—Margaret Burke
*Attorney, Agent, or Firm*—Christensen, O'Connor, Johnson & Kindness PLLC

[57] ABSTRACT

Bandwidth reduction methods and apparatus that offset the effects of dispersion on a signal transmitted through an optical fiber. The apparatus and methods employ a generator of modulated optical signals in cascade with a modulator. One of the generator and the modulator may be an optical intensity or amplitude modulator and the other a phase (or frequency) modulator. With the application of specific signals, the cascaded generator and modulator produce an optical signal with reduced energy in one half of the transmission bandwidth. One important benefit in the method is the fact that by exploiting the less obvious spectral characteristics of single sideband signals, a simple modulator design is achieved. All of the designs exploit a method of generating analytic signals via hybrid modulation.

26 Claims, 8 Drawing Sheets

OTHER PUBLICATIONS

Iwashita, K. and N. Takachio, "Chromatic Dispersion Compensation in Coherent Optical Communications," *Journal of Lightwave Technology*, 8(3):367–375 (Mar. 1990).

Winters, J.H., "Equalization in Coherent Lightwave Systems Using Microwave Waveguides," *Journal of Lightwave Technology*, 7(5):813–815 (May 1989).

Winters, J.H., "Equalization in Coherent Lightwave Systems Using a Fractionally Spaced Equalizer," *Journal of Lightwave Technology*, 8(10):1487–1491 (Oct. 1990).

Yonenaga, K., S. Kuwano, S. Norimatsu and N. Shibata, "Optical duobinary transmission system with no receiver sensitivity degradation," *Electronic Letters*, 31(4):302–304 (Feb. 1995).

May, G., A. Solheim and J. Conradi, "Extended 10 GB/s Fiber Transmission Distance at 1538 nm Using a Duobinary Receiver," *IEEE Photonics Technology Letters*, 6(5):648–650 (May 1994).

Izutsu, M., S. Shikama and T. Sueta, "Integrated Optical SSB Modulator/Frequency Shifter," *IEEE Journal of Quantum Electronics*, QE–17(11):2225–2227 (Nov. 1981).

Yonenaga, K. and N. Takachio, "A Fiber Chromatic Dispersion Compensation Technique with an Optical SSB Transmission in Optical Homodyne Detection Systems," *IEEE Photonics Technology Letters* 5(8):949–951 (Aug. 1993).

Yonenaga, K. and S. Norimatsu, "Dispersion Compensation for Homodyne Detection Systems Using a 10 Gb/s Optical PSK–VSB Signal," *IEEE Photonics Technology Letters* 7(8):929–931 (Aug. 1995).

Haykin, S., *Communication Systems*, 2nd Edition, J. Wiley & Sons, Inc., New York, 1983, problems 171 & 172.

Weaver, D.K., Jr., "A Third Method of Generation and Detection of Single–Sideband Signals," *Proceedings of the IRE* 44:1703–1705 (1956).

Villard, O., "Composite Amplitude and Phase Modulation," *Electronics*, Nov. 1948, pp. 86–89.

Powers, K.H., "The Compatibility Problem in Single–Sideband Transmission," *Proceedings of the IRE*, Aug. 1960, pp. 1431–1435.

Lockhart, G.B., "A Spectral Theory for Hybrid Modulation," *IEEE Transactions on Communications* COM 21(7):790–800 (Jul. 1973).

Hakki, B.W., "Dispersion of Microwave–Modulated Optical Signals," *Journal of Lightwave Technology* 11(3):474–480 (Mar. 1993).

HYBRID SINGLE SIDEBAND OPTICAL MODULATOR

FIELD OF THE INVENTION

This invention relates to fiber optic communication systems and to the generation of optical vestigial sideband signals, more particularly, for the purpose of transmitting digital information.

CLAIM TO COPYRIGHT

Not applicable

CROSS-REFERENCE TO OTHER APPLICATIONS

Not applicable

REFERENCE TO MICROFICHE APPENDIX

Not applicable

BACKGROUND OF THE INVENTION

Fiber optic communication systems have typically been used in broadband configurations to trunk large amounts of information over long distances. The large bandwidth and relatively low loss characteristics of optical fiber have made it useful for the efficient transport of large information bandwidths at relatively low cost. Lately, fiber optic subsystems are also finding more use in systems that were typically designed for electronic radio applications. CATV, Radar and some cellular and Personal Communication Service (PCS) subsystems now employ fiber optic links that allow operators to extend the coverage region or move more TV channels over wider distribution areas. The impending multimedia revolution, will involve the delivery of larger bandwidths to residential sites via radio subcarriers. The use of fiber is likely to increase greatly when these new services place enormous bandwidth demands on existing service delivery systems.

For clarity we define three types of optical modulation that are addressed in this document: 1. Baseband Modulation in which the signal modulated onto an optical carrier via a laser diode or external modulator, is lowpass in nature. 2. Subcarrier Modulation in which the baseband information is first modulated onto an electrical or radio frequency carrier; the modulated electrical or radio frequency carrier is then used to modulate an optical carrier. The information from the perspective of the optical carrier is itself a (bandpass) modulated carrier. 3. Subcarrier Modulation with Harmonic Frequency Translation in which the modulation of a radio frequency carrier is modulated as in subcarrier modulation above but it is then modulated onto an optical carrier in a fashion that produces harmonics of the subcarrier signal about the optical carrier. Upon detection of the optical signal, a desired harmonic of the original radio subcarrier is isolated in a bandpass filter. See Generation and Transmission Of FM and p/4 DQPSK Signals at Microwave Frequencies Using Harmonic Generation and Opto electronic Mixing in Mach-Zehnder Modulators, Tom Young, Jan Conradi, Wayne Tinga and Bob Davies, IOOC 95, June 1995 and Generation and Transmission Of FM and p/4 DQPSK Signals at Microwave Frequencies Using Harmonic Generation and Opto electronic Mixing in Mach-Zehnder Modulators, Tom Young, Jan Conradi and Wayne Tinga, IEEE Transactions on Microwave Theory and Techniques, vol. MTT 44, pp 446–453, March 1996.

The net result of this exercise is optical transport of a radio subcarrier with an additional frequency translation to some higher frequency at the optical detector output. The benefit of this method is that the information signal may be modulated onto the optical carrier at a lower cost by using lower frequency radio components. Baseband modulation is typically applied in broadband data transmission whereas subcarrier modulation is typically used for distribution of CATV, Cellular and other media that employ radio or radio compatible transmission and signal multiplexing. Baseband and subcarrier optical fiber distribution systems are subject to distortion related to loss, noise, and nonlinearities in both the fiber and the modulation and amplification devices. One of the more deleterious forms of nonlinear distortion is that due to chromatic dispersion. Chromatic dispersion in optical fiber is typically characterized to a first order by a linear group delay parameter. The group refractive index of the fiber at optical frequencies near a given optical carrier frequency varies approximately linearly with wavelength or optical frequency about the carrier. This finite linear group delay imposes a quadratic phase rotation across the signal frequency band. While dispersion has an undesired effect on any signal of finite bandwidth it is of particular concern in optical systems where the modulated signal is also contaminated with an unwanted phase or frequency modulated component which is prevalent when optical sources such as semiconductor lasers are directly modulated, and when various external modulators are used. See Fumio Koyama, Kenichi Iga, "Frequency Chirping In External Modulators" Journal of Lightwave Technology, Vol. 6, No 1, pp 87–93, January 1988.

Approaches currently used to reduce the effects of chromatic dispersion include: (1) reversing the effects of chromatic dispersion in the optical domain, (2) reversing the effects in the electrical domain after optical detection and (3) reducing the transmission bandwidth of the optical signal on the fiber. The first is based on purely optical methods where the effects of group velocity dispersion are reversed while the signal is still in the optical domain. Adding dispersion compensating fiber in the transmission path is one common approach. Other optical methods include compensation by differential time delay of the upper and lower sidebands of the modulated signal, see A. Djupsjobacka, O. Sahlen, "Dispersion compensation by differential time delay," IEEE Journal of Lightwave Technology, vol. 12, no. 10, pp. 1849–1853, October 1994; spectrally inverting the signal at the midpoint of the transmission path, see R. M. Jopson, A. H. Gnauck, R. M. Derosier, "10 Gb/s 360-km transmission over normal-dispersion fiber using mid-system spectral inversion," Proceedings OFC'93, paper PD3, 1993; and pre-chirping the transmitted signal in an external modulator, see F. Koyama, K. Iga, "Frequency chirping in external modulators," IEEE Journal of Lightwave Technology, vol. 6, no. 1, pp. 87–03, January 1988 and A. H. Gnauck, S. K. Korotky, J. J. Veselka, J. Nagel, C. T. Kemmerer, W. J. Minford, D. T. Moser, "Dispersion penalty reduction using an optical modulator with adjustable chirp," IEEE Photonics Technology Letters, vol. 3, no. 10, pp. 916–918, October 1991.

The second approach, in which dispersion effects are reversed in the electrical domain, is based on coherent transmission and heterodyne detection followed by equalization in the electrical domain. It is important to note that a double sideband (DSB) signal must be heterodyne detected if the signal is to be compensated electrically. If homodyne detection were attempted with a DSB signal, the upper and lower sidebands would overlap upon detection and the phase information would be lost and the higher modulation frequencies severely attenuated or distorted through cancellation of sideband components. Some techniques used or proposed for post-detection equalization include microstrip lines, see K. Iwashita, N. Takachio, "Chromatic dispersion compensation in coherent optical communications," Journal of Lightwave Technology, vol. 8, no. 3, pp. 367–375, March 1990; microwave waveguides, see J. H. Winters, "Equalization in coherent lightwave systems using microwave waveguides," Journal of Lightwave Technology, vol. 7, no. 5, pp. 813–815, May 1989. and fractionally spaced equalizers, see J. H. Winters, "Equalization in coherent lightwave systems using a fractionally spaced equalizer," Journal of Lightwave Technology, vol. 8, no. 10, pp. 1487–1491, October 1990.

The third approach is to modify the transmission format where the baseband signal spectrum is compressed. These types of approaches, which reduce the transmission bandwidth required on the fiber to transmit a given bit rate, are generally implemented by modifying the line code format in order to reduce the effective bandwidth required to transmit or receive the data, see K. Yonenaga, S. Kuwano, S. Norimatsu, N. Shibata, "Optical duobinary transmission system with no receiver sensitivity degradation," Electronic Letters, vol. 31, no. 4, pp. 302–304, February 1995, and G. May, A. Solheim, J. Conradi, "Extended 10 Gb/s fiber transmission distance at 1538 nm using a duobinary receiver," IEEE Photonics Technology Letters, vol. 6, no. 5, pp. 648–650, May 1994.

The generation, transmission and detection of single sideband (SSB) signals has been used in the RF and microwave regions of the electromagnetic spectrum to reduce the bandwidth of the signal by a factor of two, by sending either the upper or the lower sideband. Generation and transmission of SSB optical signals using a Mach-Zehnder modulator is shown in M. Izutsu, S. Shikama, T. Sueta, "Integrated optical SSB modulator/frequency shifter," IEEE Journal of Quantum Electronics, vol. QE-17, no. 11, pp. 2225–2227, November 1981 and R. Olshansky, "Single sideband optical modulator for lightwave systems," U.S. Pat. No. 5,301,058, 1994. A dispersion benefit accrues from a single sideband signal due to the fact that the transmitted signal spectrum has been reduced by a factor of two.

A more significant advantage of optical SSB transmission is that upon detection, particularly if the signal is coherently detected, a dispersed baseband signal is produced where the information of the relative arrival time of the various signal frequencies remains as part of the electrical output signal and hence the fiber dispersion can be compensated in the electrical domain after detection. This advantage is similar to that for heterodyne detection of DSB signals, but with SSB transmission and detection, the signal can be homodyned directly to baseband using carrier signal added either at the source or at the receiver and thus it can be directly detected with the phase or delay information of the transmitted signal preserved.

An early integrated optical SSB modulator using optical filtering techniques was described in K. Yonenaga, N. Takachio, "A Fiber chromatic dispersion compensation technique with an optical SSB transmission in optical homodyne detection systems," IEEE Photonics Technology Letters, vol. 5, no. 8, pp. 949–951, August 1993, where integrated optical structures were used to generate single sideband tones for narrowband applications. In K. Yonenaga, N. Takachio, "Dispersion compensation for homodyne detention systems using a 10 Gb/s optical PSK-VSB signal," IEEE Photonics Technology Letters, vol. 7, no. 8, pp. 929–931, August 1995, a single sideband optical modulator was described for the purpose of transmitting two or more optical signals with different optical carrier frequencies on a single fiber. The purpose of transmitting the signals in a single sideband format is to permit these optical carrier frequencies to be spaced as closely as the maximum modulation frequency. Further work on generation of SSB optical signals with a Mach-Zehnder modulator is found in Olshansky, U.S. Pat. No. 5,301,058.

In another technique, disclosed in co-pending application Ser. No. 08/738,573, now U.S. Pat. No. 5,880,870 assigned to the same assignee, a single Mach-Zehnder modulator is driven by Hilbert Transform pairs in two different ways to yield a vestigial sideband. In one case the Mach Zehnder is driven in "Hartley Fashion" with Hilbert Transform pairs of a baseband digital signal applied to the individual modulator arms. In the other case the modulator is driven in hybrid fashion with linear combinations of the baseband signal Hilbert Transform pairs to simultaneously achieve an optical signal that is amenable to simple envelope detection and vestigial sideband generation and transmission. The use of Hilbert transform pairs to generate single sidebands is disclosed in Gordon B. Lockhart, "A Spectral Theory for Hybrid Modulation", IEEE Transactions on Communications, Vol. COM 21, No. 7, July 1973.

Baseband and subcarrier optical fiber systems may be improved if either some or all of the upper or lower optical sideband band could be removed from the optical signal before transmission. For Intensity Modulated—Direct Detection (IMDD) systems each sideband carries redundant information in terms of what is required to demodulate the information signal at the destination so there is no requirement for double sideband optical transmission. What remains after sideband removal is a narrow band signal that even with FM contamination is greatly reduced in effective bandwidth and dispersion distortion.

For subcarrier modulation, which typically has a much lower information bandwidth per subcarrier, the separation of upper and lower optical signal sidebands after optical modulation may be quite large. Upon detection the upper and lower optical sidebands are essentially collapsed onto each other and any phase distortion that the signal encountered on the fiber will be imposed on the detected subcarrier signal as cross band phase distortion. See Basil W. Hakki, "Dispersion of Microwave-Modulated Optical Signals", Journal of Lightwave Technology, Vol. 11, No 3, pp 474–480, March 1993.

SUMMARY OF THE INVENTION

Bandwidth reduction methods and apparatus are disclosed that offset the effects of dispersion on a signal transmitted through an optical fiber. The apparatus and methods employ a generator of a modulated optical signal in cascade with a separate modulator. One of the generator and the modulator may be an optical intensity or amplitude modulator and the other a phase (or frequency) modulator. With the application of suitable signals, the cascaded generator and modulator produce an optical signal with reduced power in one half of the transmission bandwidth. One important benefit in the method is the fact that by exploiting the less obvious spectral characteristics of single sideband signals, a simple modulator design is achieved. All of the designs exploit a method of generating analytic signals via hybrid modulation.

An analytic signal may be decomposed into a phase modulation component and an amplitude modulation component. The advantage for the present application is that amplitude modulation is readily amenable to direct detection while phase modulation with the argument of the analytic signal associated with the information signal or the Hilbert Transform of the information signal may be used to reduce the required bandwidth of the transmitted signal.

According to one aspect of the invention, a laser diode is intensity modulated with a baseband or subcarrier signal. The laser diode is cascaded with an optical phase modulator to which the Hilbert transform of the intensity modulating signal is applied. The overall effect is to reduce the spectral occupancy of the optical signal from the double sided signal required for a simple intensity or amplitude modulated signal to a single sided signal. The envelope of the electric field is not affected since the Hilbert modulated portion of the optical bandpass signal is phase modulated and has a constant envelope. At the receive end the signal may be accurately detected in a simple photodiode detector.

According to a further aspect of the invention, optical amplitude modulation is carried out in a Mach-Zehnder modulator, or any other external modulator, and the phase modulation is undertaken in an optical phase modulator.

According to a further aspect of the invention, laser chirping is used to achieve phase modulation. Laser chirp may be modeled as linear frequency modulation for small modulation currents. The mathematical first derivative of the required phase modulation signal is added to the laser bias signal and applied to the laser so the phase of the optical electric field emitted from the laser varies proportionally. The inherent amplitude modulation that will additionally take place in the laser is, in this case, seen as distortion. The laser is cascaded with an external amplitude modulator to achieve the required envelope modulation. A scaled inverse of the phase modulation signal may be added to the amplitude modulation signal to cancel the distortion signal emitted from the laser.

In a method according to the invention, a modulated optical signal to be transmitted along an optical light guide is produced by:

generating a modulated optical signal on the optical light guide with a modulated optical signal generator, in which the optical signal is modulated by one of an amplitude modulator and a phase modulator; and subsequently modulating the modulated optical signal carried by the optical light guide, in which the optical signal is modulated by the other of an amplitude modulator and a phase modulator.

The modulation signals for the amplitude modulator and the phase modulator are selected so that the modulated optical signal has reduced power in one half of the transmission bandwidth, and is preferably single side band.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
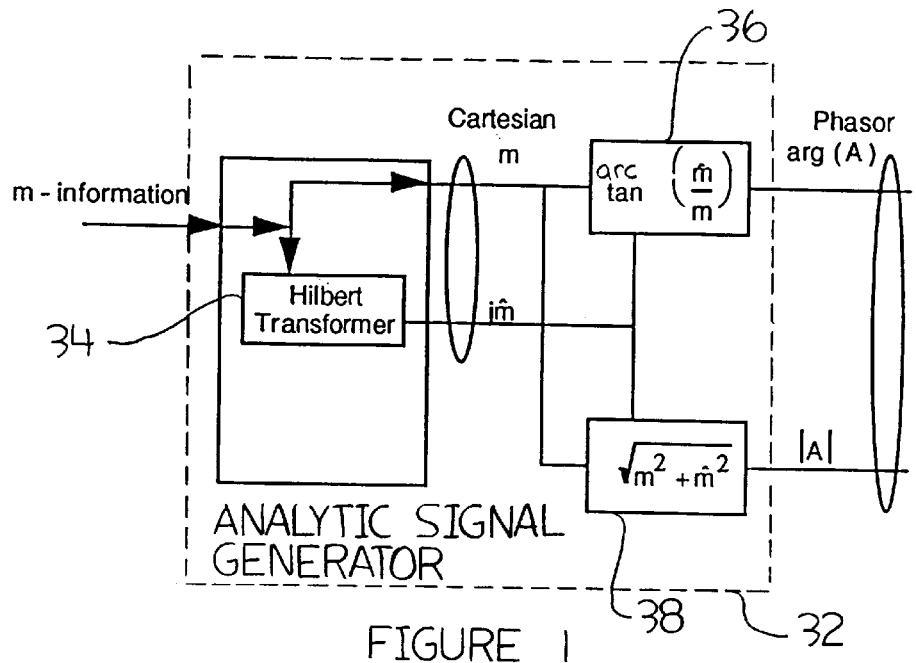
FIG. 1 is a block diagram of a signal transformer that converts a real causal information signal to its analytic representation. The output may be in Cartesian or Polar form.

Central to the theory of single sideband signals is the analytic signal. The characteristic of analytic signals that is crucial to SSB modulation is that analytic signals have no negative frequencies. The generation of analytic signals requires the synthesis of Hilbert Transform pairs which in the case of subcarrier modulation is quite straightforward and in the case of baseband modulation is very difficult. In this patent document, m(t) or just m is used to refer to a real baseband or subcarrier information signal. The Hilbert transform $\hat{m}(t)$ of m(t) is defined by $$\frac{j}{\pi} \int_{-\infty}^{\infty} \frac{m(t')}{t-t'} dt' \quad (1)$$

Then A(t), defined by $$A(t) = m(t) + j\hat{m}(t) \quad (2)$$

is a complex bandlimited analystic signal. If q(t) is a bandpass signal defined by $$q(t) = A(t)\exp(j\omega_0 t) \quad (3)$$

and if A(t) is analytic with no negative frequencies, then q(t) is a single sideband signal. A(t) can be represented in polar form by $$A(t) = |A(t)|\exp(j\arg(A(t))) \quad (4)$$

Equation (3) now becomes $$q(t) = |A(t)| \cdot \exp(j\arg(A(t))) \cdot \exp(j\omega_0 t) \quad (5)$$

which is a combination of amplitude and phase modulation imposed on the complex carrier. The structure of a modulator that will achieve this type of modulation is shown in FIGS. 3–11. Equation 5 is commutative and the modulator structure is reversible. Intensity or amplitude modulation is achieved by applying the envelope of the analytic representation of the modulating signal respectively to the laser diode current or to the electrodes of an external amplitude modulator and phase modulation is achieved by application of the argument of the analytic representation of the modulating signal to the laser current or to the electrodes of the phase modulator. These structures differ from previous disclosures such as the Hartley modulator which relies on cancellation to achieve sideband removal. Additionally this method requires some preconditioning of the modulating signal in that, for strictly defined single sideband modulation, the envelope and argument of the analytic signal must be extracted and applied to the modulator components.

For direct detection optical systems the modulating signal in equation (5) is unsuitable since the optical carrier must be recovered to recover the information signal. Two modifications may be made to overcome this difficulty. Firstly, an optical carrier component that is not amplitude modulated may be added, such that equation (5) may be modified to:

$$q(t) = (1+m(t)) \cdot \exp(j\arg(A(t))) \cdot \exp(j\omega_0 t) \quad (6)$$

The amplitude portion of the modulating signal is now just the baseband signal while the phase portion is the argument of the analytic signal associated with m(t). The optical signal envelope in this case varies directly with m(t) and can be directly detected with no special requirements. This version of the single sideband signal is however slightly non-ideal in terms of the general expression in equation (5) and will never yield perfect sideband cancellation.

A further simplification may be made such that $$q(t) = (1+m(t)) \cdot \exp(j\hat{m}(t)) \cdot \exp(j\omega_0 t) \quad (7)$$

where the phase modulating portion of the information is simply the Hilbert transform of the baseband information.

All of the above expressions in equations (5–7) for the modulated signal will yield single sideband or vestigial single sideband with respect to the electric field on an optical fiber whereas only expressions (6) and (7) will be suitable for direct detection.

The approximations of equations (5–7) will not be accurate if the signals defined by the Hilbert Transform information stray too far from an assumption that the overall signal is Minimum Phase in nature. The property of minimum phase systems that is crucial to this development is that the log amplitude and argument of the Z transform of a stable causal sequence are Hilbert Transforms pairs. If the information signal to be transmitted is the real part of a Z-transform of a stable and more importantly causal sequence then the characteristics of the inverse transform sequence (which is in the present case the Frequency Characteristics) may be modified to yield optimal transmission parameters.

A real information signal I(t) may be forced to be minimum phase by taking the Hilbert transform of the log of I(t):

$$H_L(I(t)) = H(\log(I(t))) \quad (8)$$

This enforces a minimum phase condition on the information since when the anti log of $\log(I(t)+jH_L(I(t)))$ is taken, $I(t)\exp(jH_L(I(t)))$ is obtained, which is the polar representation of the Z-transform of a stable causal sequence and which is what is needed to achieve vestigial single sideband transmission via hybrid modulation. Real signals need not be perfectly minimum phase in order to exhibit desirable frequency characteristics. Vestigial sideband transmission is achievable with up to 25 dB of sideband suppression without any log compression of the information signal by scaling the information signal and Hilbert Transform signal appropriately. In some cases, the scaled Hilbert Transform signal approximates the Hilbert Transform of the log of the information signal quite closely. The simpler the signal, the better the success of the bandwidth reduction technique. Envelope signals that are similar in nature to their own exponentials (such as offset bilevel signals) are the best for this type of scaling.

In the case where the information signal is modulated onto an electronic subcarrier before optical modulation, it can be shown that if m(t) is a real signal with no frequency components outside a band [−B,B] and if cos(φ(t)) has no frequency components inside the band [−B,B] then $$H(m(t)\cos(\phi(t))) = m(t)H(\cos(\phi(t))) \qquad (9)$$

where H denotes the Hilbert Transform. and if cos(φ(t))=cos(wt) then H(cosφ/(t)))=sin(wt) and $$H(m(t)\cos(\phi(t))) = m(t)\sin(\phi(t)) \qquad (10)$$

For a narrowband (i.e. subcarrier) process the Hilbert transform may be obtained by phase shifting the subcarrier by (−π/2) and modulating with the regular information signal. This process may also be achieved by taking the time derivative or integral of the subcarrier signal. For narrowband processes the time derivative of a real subcarrier signal has spectral properties similar to the Hilbert Transform. If the process is sufficiently narrowband then no frequency weighting correction is required. For the purpose of generalizing the embodiments laid out in this document no distinction is made between subcarrier signals and baseband signals which are in turn modulated onto the optical carrier in the case of 'linear' optical modulation. That is to say that where the information modulated onto the optical carrier is offset from the optical carrier in frequency by the same amount that it would be offset from DC were it not modulated onto the optical carrier, there is no difference between the case where the baseband information signal is modulated directly onto the optical carrier and the case where the information is modulated onto a radio subcarrier, the composite radio subcarrier and information then being modulated onto the optical carrier. Both subcarrier and baseband modulation in this case are referred to as 'baseband'. A distinction is made however for the case of vestigial sideband subcarrier modulation with harmonic frequency translation. In this scheme, which is outlined below, preparation of the modulation signal is specific and distinguished as such.

Figure 14:
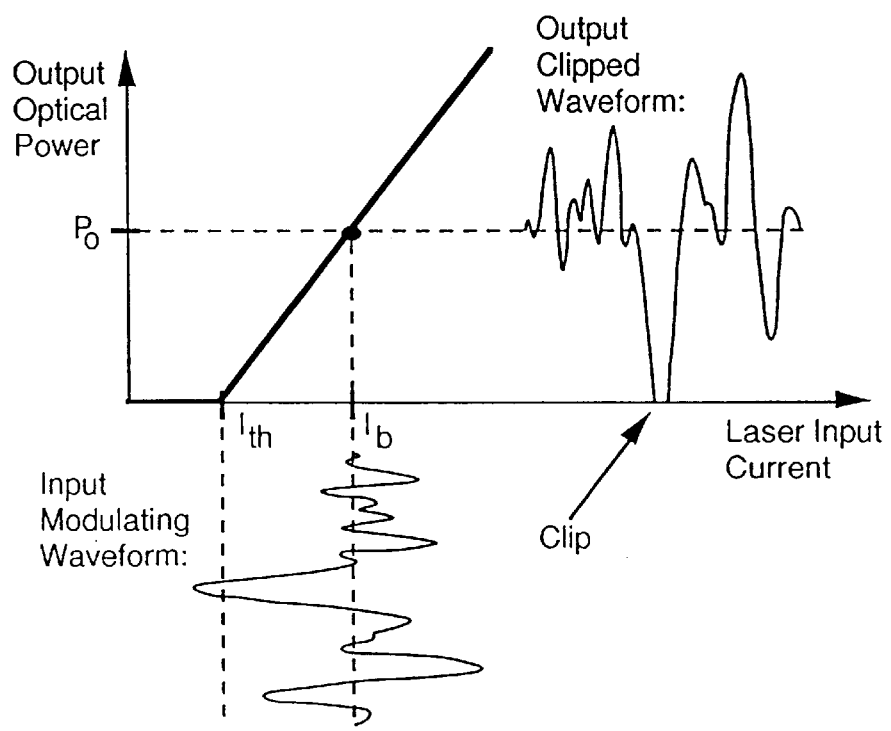
FIG. 14 is a schematic drawing showing non-linear distortion generated when a laser diode is operated beyond its linear range by producing a clipped output.
Figure 15:
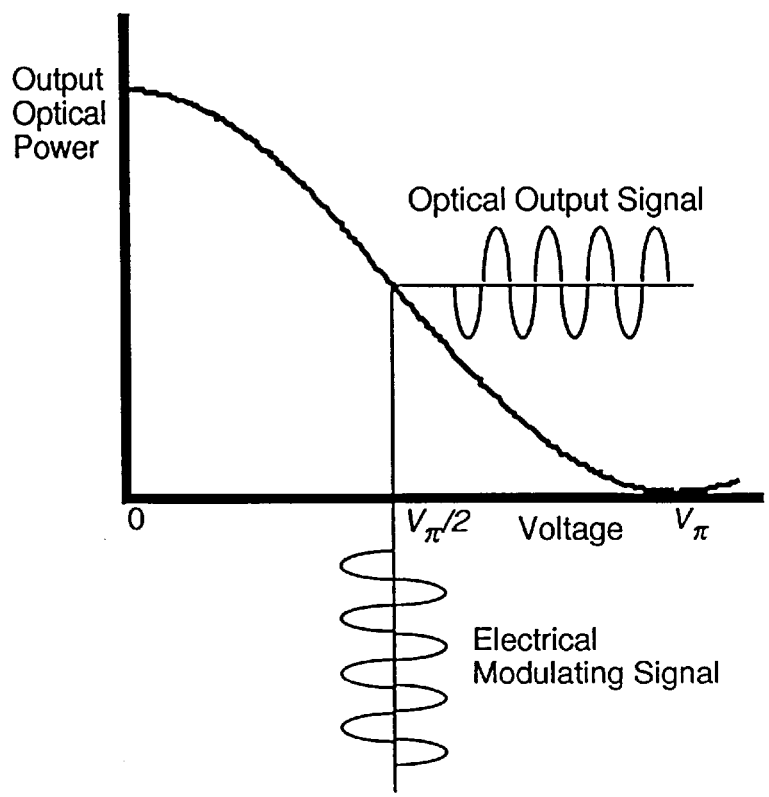
FIG. 15 is a schematic drawing showing the operating characteristics of a Mach-Zehnder modulator biased at the operating point that yields best linear performance as an amplitude or intensity modulator.

Vestigial sideband subcarrier modulation with harmonic frequency translation exploits the inherent nonlinear characteristics of optical modulators to achieve frequency translation of the subcarrier components about the optical carrier. A non-linear mechanism in the laser, for example, is the clipping nonlinearity where the laser is driven well into the clipping region (FIG. 14) while useful non-linear modulation is obtained with the Mach Zehnder biased at quadrature (FIG. 15) and driven such that the output signal energy is distributed out into the higher output harmonics of the modulating signal. The phase modulator and Mach Zehnder output may be described by different types or combinations of Bessel expansions whose harmonic content is determined by the scaling of the argument to the Bessel function. The result is that replication of the fundamental subcarrier signal appears at multiples of the subcarrier center frequency about the optical carrier.

When the optical signal is captured in direct detection fashion this harmonic structure is translated to baseband. Capturing one of these harmonics in a bandpass filter at the detection output is equivalent to upconversion of the original subcarrier signal.

Figure 12:
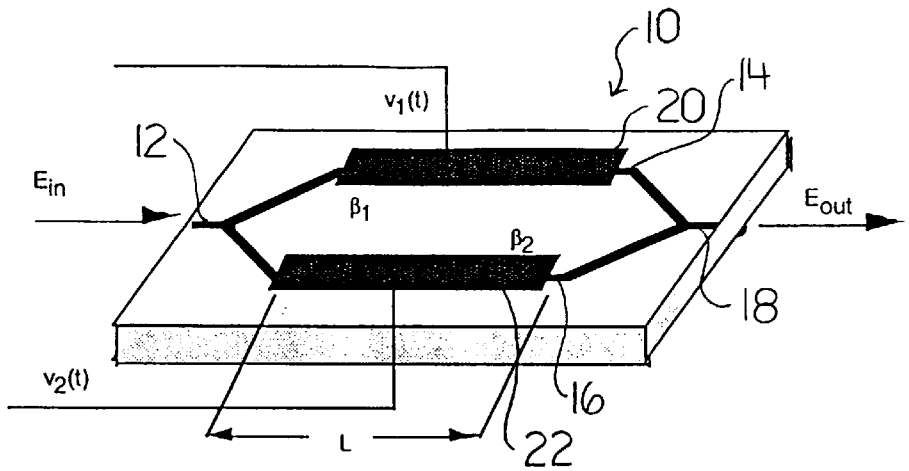
FIG. 12 is a schematic drawing of Mach Zehnder external optical modulator.

The Mach Zehnder modulator is a balanced bridge interferometer that allows amplitude modulation of the optical carrier. The Mach Zehnder modulator is known in the art in itself, and so only the characteristics important to the present invention are described here. Shown in FIG. 12, the ideal modulator 10 consists of an optical splitter 12 coupled to two identical phase modulating waveguides 14, 16 forming the two arms of the modulator 10, which waveguides 14, 16 are in turn connected to an optical combiner 18. The refractive index of the waveguides 14, 16 is electronically modulated by application of a potential to the electrodes 20, 22 either covering or adjacent to the waveguides 14, 16. Application of proper bias voltages to establish phase imbalance conditions in addition to modulation allows a variety of modulation schemes to be implemented. The basic input/output relation for the Mach Zehnder modulator is $$E_{out} = E_{in}/2[\exp(-j\pi v_1(t)/V_\pi) + \exp(-j\pi v_2(t)/V_\pi + \phi_b)] \qquad (10)$$

where $v_1(t)$ or $v_2(t)$ are the applied voltages as shown in FIG. 12. $V_\pi$ is the extinction voltage which is the voltage differential, applied to the electrodes 20, 22, required to establish a phase difference of n radians between the unmodulated optical signals in the two arms 14, 16. $\phi_b$ is the phase bias between the modulating arms 14, 16. The applied voltages are usually normalized to Vπ. Except when harmonics of the information signal are desired to be produced, the Mach-Zehnder modulator is preferably operated as close to linearly as is practicable.

Figure 13:
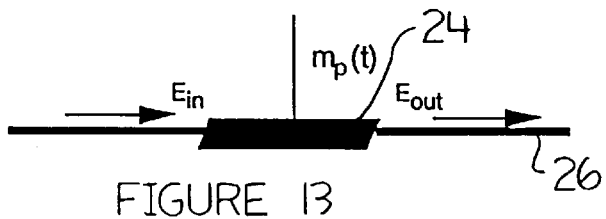
FIG. 13 is a schematic drawing of an optical waveguide phase modulator.

An optical phase modulator 24 on an optical waveguide 26 as shown in FIG. 13 is typically implemented in an optical waveguide structure that allows electrical control of the guide refractive index which in turn allows control of the instantaneous frequency of the optical electric field in the guide 26. Unless otherwise specified in this patent document, the phase modulator is operated linearly to cause the phase of an optical signal traversing the phase modulator 24 to change linearly with a modulation signal. Optical phase modulation may also be implemented in a Mach Zehnder modulator by applying identical voltages to each modulating arm of the modulator with no phase bias between the arms.

Referring now to FIG. 1, an analytic signal generator 32 receives an information signal m, and calculates the Hilbert transform of m in Hilbert transformer 34. Processor 36 has as input the information signal m and its Hilbert transform m̂ and generates the argument of A, namely arg A, where A=m(t)+jm̂(t) according to the equation arg A=tan$^{-1}$(m̂/m). Processor 38 also has as its input m and m̂, and generates the amplitude of A, defined by |A|=√(m$^2$+m̂$^2$). The analytic signal generator 32 may operate on carrier, subcarrier and baseband signals. The analytic signal generator 32 may be implemented in any of a variety of known signal processors using the equations defined in this patent document.

Figure 2:
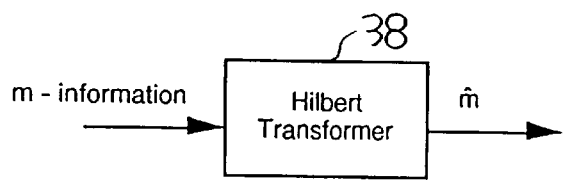
FIG. 2 is a block diagram of a signal transformer that converts a real causal information signal to its Hilbert Transform.

FIG. 2 shows a block diagram of a Hilbert transformer 38 with an input information signal m and an output information signal m̂. The analytic signal generator 32 and Hilbert transformer 36 are used in the embodiments disclosed in FIGS. 3–11.

FIGS. 3–11 show several embodiments of optical signal modulation system for modulating the amplitude and phase of an optical carrier. In each system, a generator 40A, 40B or 40C of a modulated optical signal is cascaded with a separate modulator 42A or 42B on an optical light guide 44. The optical light guide 44 is connected to receive a modulated optical signal from the generator 40A–40C and the modulator 42A or 42B modulates the light carried by the optical light guide 44.

Figure 3:
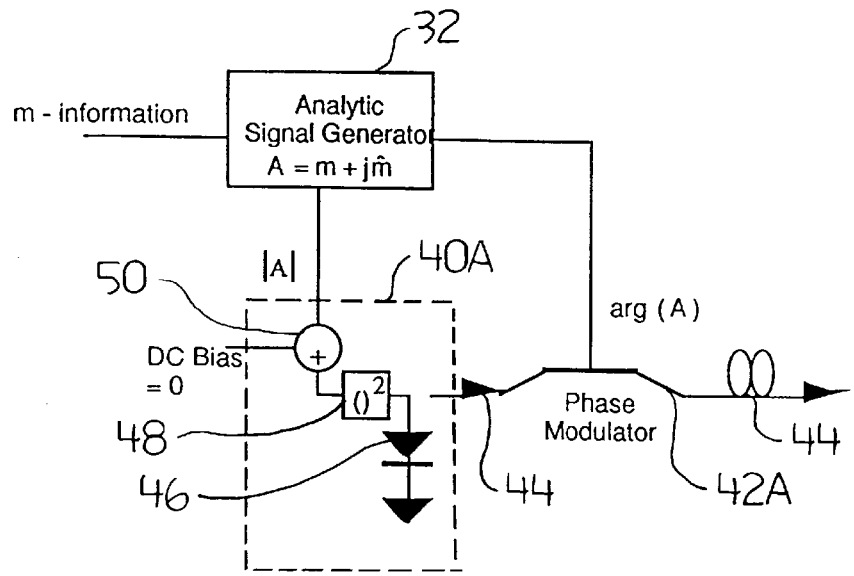
FIG. 3 is a schematic drawing of an optical single sideband modulator in accordance with the invention that employs a cascade of a laser diode intensity modulator and an optical phase modulator. The laser modulation signal is the square of the envelope of the analytic signal associated with the information signal m. The phase modulator signal is the argument of the analytic signal associated with the information signal m.

In FIG. 3, generator 40A is formed of a laser diode 46 that acts as the source of optical power. The laser diode 46 is conventional and needs no further description. It is preferred that the laser diode be operated in its linear regime, except when required to produce harmonics of the information signal. The generator 40A also includes a signal processor 48 that squares the output from analytic signal generator 32. A DC bias current may be added at 50 if required for the laser diode. The laser diode current is thus modulated by the square of the amplitude |A| output from the analytic signal generator 32, and the generator 40A thus generates an intensity modulated optical carrier that is output along the guide 44. An optical phase modulator 42A follows the generator 40A. The optical phase modulator 42A is modulated with the argument of A output from the analytic signal generator 32. The interaction of the intensity modulation on the laser diode output and the phase modulation in the phase modulator 42A produces a single or vestigial sideband signal depending on the nature of the modulating signal.

The output optical power from an ideal laser diode modulator as a function of input current is given by:

$$P_{out} = \eta[I_B - I_{th}](1 + m_{LD} m_i(t)) \tag{11}$$

where $P_{out}$ is the output power, $m_{LD}$ is the laser modulation index, $\eta$ is the laser modulation efficiency in W/A, $I_B$ is the laser bias current, $I_{th}$ is the laser threshold current, $m_i(t)$ is the amplitude part of the information signal. When $m_{LD} \cdot m_i(t) < -1$, the laser output is clipped, producing a non-linearity that is used in generating harmonics of a subcarrier signal. In the figures the laser signal has been normalized to a simple bias term and modulating term without scaling information. For FIG. 3, the intensity modulating signal is given by $|A|^2$ which is the square of the envelope of the analytic signal as per the development in equations 4–8. The t parameter has been dropped for convenience. The square scaling is used to ensure that the electric field from the laser is correctly scaled with the electric field modulation from the phase modulator 42A, since the optical power or intensity varies as the squared magnitude of the optical electric field. The phase modulation signal is then given by arg(A) which is the inverse tangent of the imaginary and real parts of the analytic signal A. The overall normalized expression for the complex envelope of the output signal from the modulator structure in FIG. 3 is given by $$|A|\exp(\arg(A)) \tag{12}$$

which, by equations (4–8), is the ideal analytic signal. The laser bias is not shown as a separate term since the term |A| is always positive and as such contains a DC term, which may be viewed as a bias term. In cases where the envelope term is scaled, then a laser bias may be added to the expression in equation (12).

Figure 4:
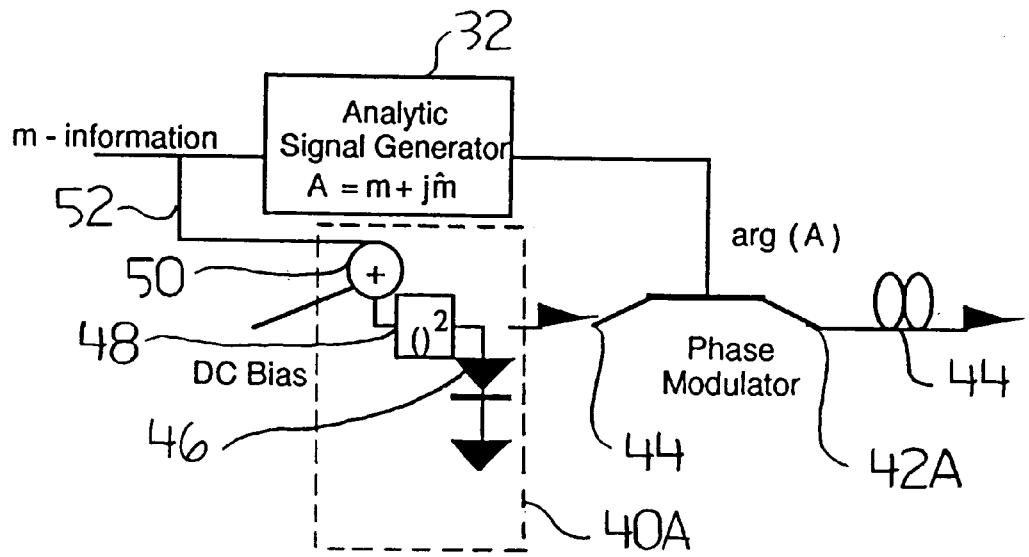
FIG. 4 is a schematic drawing of an optical single sideband modulator in accordance with the invention that employs a cascade of a laser diode intensity modulator and an optical phase modulator. The laser modulation signal is the square of the information signal m plus bias. The phase modulator signal is the argument of the analytic signal associated with the information signal m.

The device shown in FIG. 4 is a variation on the device in FIG. 3 in which the amplitude modulation signal is the square of the information signal. Apart from the connection of the modulation input for the laser diode 46 to the source of the information signal (along line 52), FIG. 4 includes the same elements as FIG. 3. The overall signal output from the modulator is given by $$(1+m)\exp(j\arg(A)) \tag{13}$$

which is non ideal in comparison to the analytic signal but will yield a partial or vestigial sideband signal in which the sideband power on one side of the optical carrier is reduced.

Figure 5:
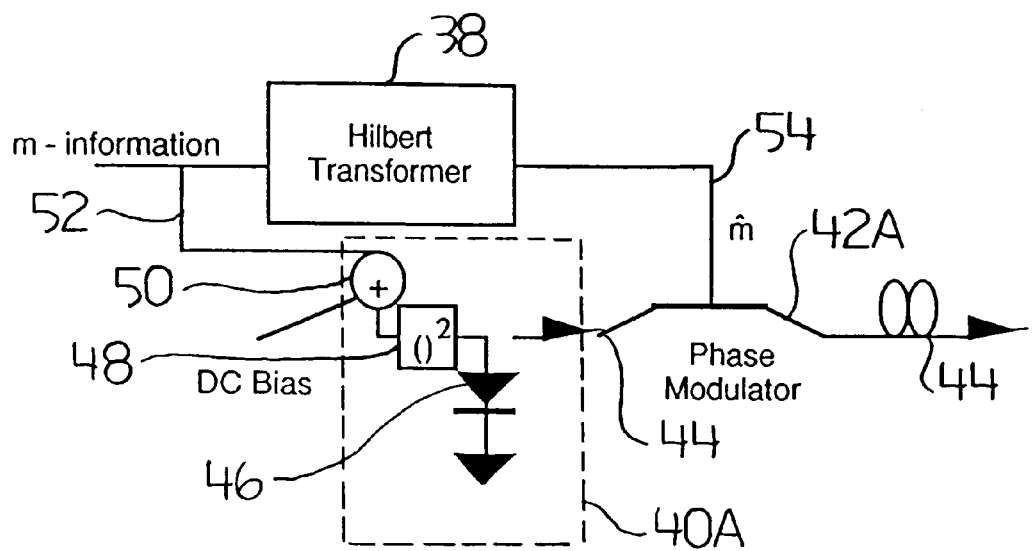
FIG. 5 is a schematic drawing of an optical single sideband modulator in accordance with the invention that employs a cascade of a laser diode intensity modulator and an optical phase modulator. The laser modulation signal is the square of the information signal m. The phase modulator signal is the Hilbert Transform of the information signal m.

The device in FIG. 5 is a further simplification from the device in FIG. 4 in which the phase signal input to the phase modulator 42A along line 54 is the Hilbert Transform of the information signal output from Hilbert transformer 38. The output expression is now $$(1+m)\exp(j\hat{m}) \tag{14}$$

which may be ideal or nonideal depending on the relationship between the signal m and its Hilbert transform.

To achieve harmonic upconversion in the laser/phase modulator structures in FIGS. 3–5, firstly the laser diode 46 is driven to the point that the input signal becomes negative. Since the laser diode 46 only allows positive output the output optical waveform from the laser diode 46 will be clipped, as in FIG. 15. This has the effect of producing harmonics of the input signal at frequency offsets from the optical carrier that are integer multiples of the input fundamental frequency. The phase modulator 42A produces harmonics in a different manner since its modulation mechanism (ie phase modulation) is inherently non-linear. The phase modulator 42A is well characterized by Fourier transformation and the relative power in the harmonics that are always present in the phase modulator output may be controlled by varying the modulation drive signal input. When the optical signal is detected these shifted optical components emerge as frequency upconverted versions of the subcarrier modulation signal applied to the optical modulator 42A. To achieve simultaneous harmonic upconversion and sideband cancellation in the structures of FIGS. 3–5 the drive levels to the laser diode 46 and phase modulator 42A are adjusted so as to produce harmonics by the above mechanisms. The interactions of the respective higher harmonics of the input signal interact in the same fashion so as to mutually cancel sidebands at specific harmonic offsets from the optical carrier. This type of modulation is only effective on subcarrier type input signals.

Real laser diode modulators have an inherent non ideality in the fact that frequency modulation is present in the output. This is due to voltage dependencies of the refractive index in the laser active region. This frequency modulation is referred to as chirp and in the case of baseband modulation will have a detrimental effect on the effectiveness of the cancellation of signal sidebands. It is preferred, therefore, to use laser diodes in the operation of the invention that have minimum chirp or other sources of distortion. Subcarrier modulation offers a rather interesting variation on this theme since laser chirp can actually enhance the single sideband effect if the intensity modulation and frequency modulation are in phase and the modulation index is small.

Figure 6:
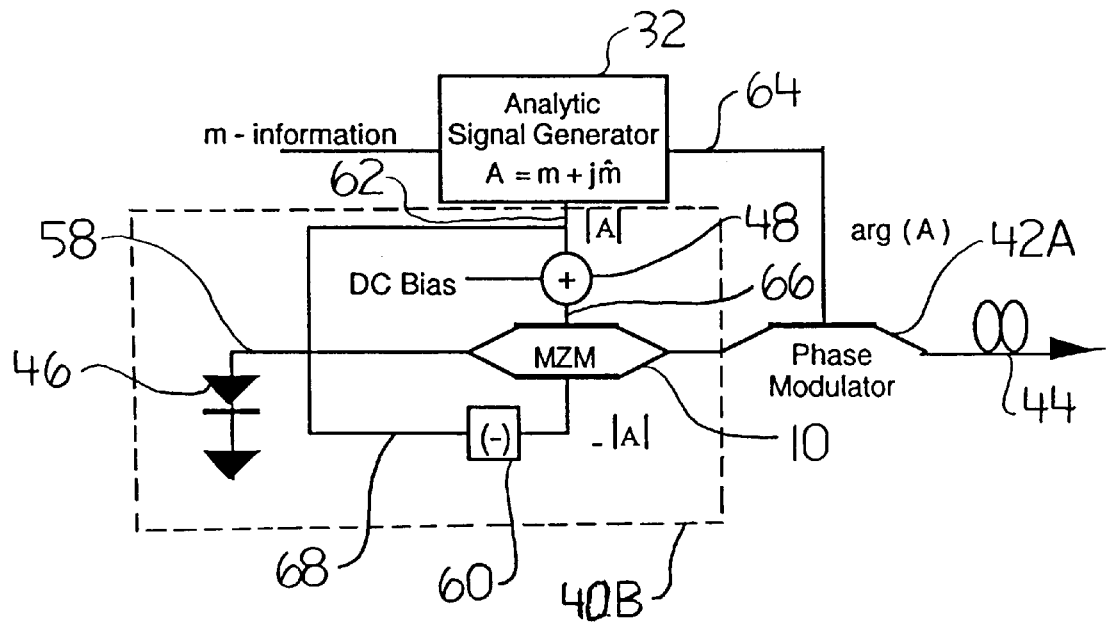
FIG. 6 is a schematic drawing of an optical single sideband modulator in accordance with the invention that employs a cascade of a Mach Zehnder type external optical amplitude modulator and an optical phase modulator. The amplitude modulation signal is the envelope of the analytic signal associated with the information signal m. The phase modulator signal is the argument of the analytic signal associated with the information signal m.
Figure 7:
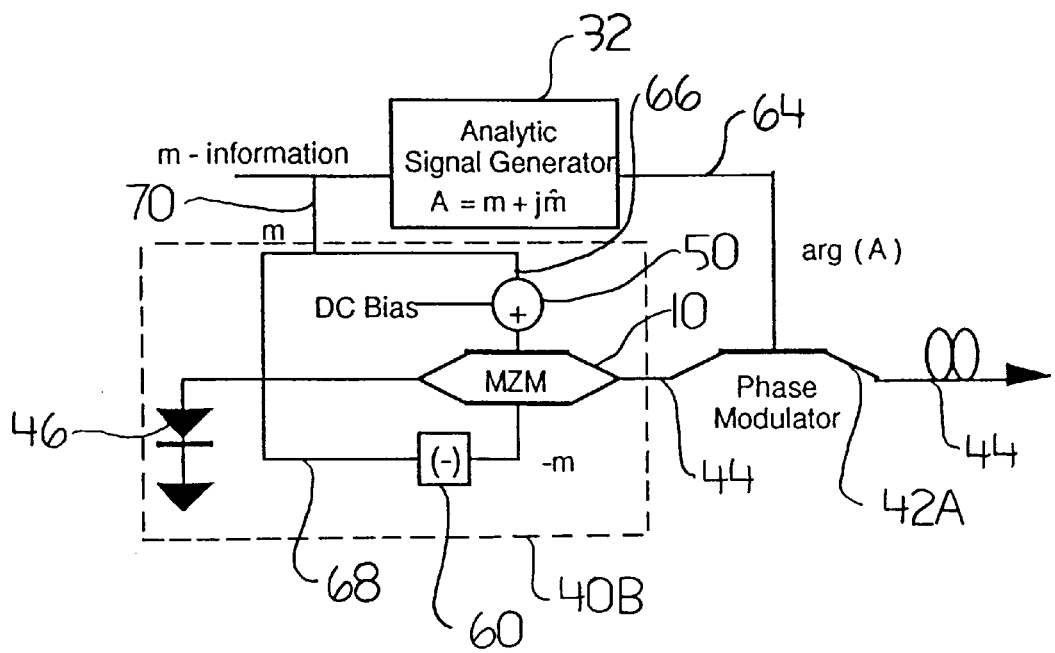
FIG. 7 is a schematic drawing of an optical single sideband modulator in accordance with the invention that employs a cascade of a Mach Zehnder type external optical amplitude modulator and an optical phase modulator. The amplitude modulation signal modulation signal is the information signal m. The phase modulator signal is argument of the analytic signal associated with the information signal m.
Figure 8:
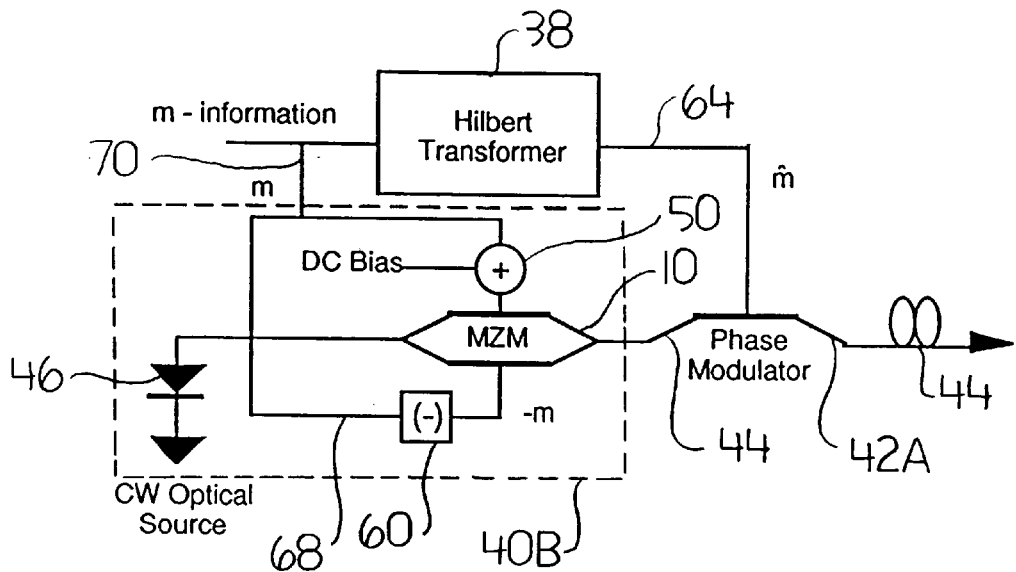
FIG. 8 is a schematic drawing of an optical single sideband modulator in accordance with the invention that employs a cascade of a Mach Zehnder type external optical amplitude modulator and an optical phase modulator. The amplitude modulation signal modulation signal is the information signal m. The phase modulator signal is the Hilbert Transform of the information signal m.

Referring to FIGS. 6–8, generator 40B includes a laser diode 46 that generates an optical carrier output to the optical light guide 58, and a Mach-Zehnder modulator 10. The generator 40B is cascaded with a phase modulator 42A similar to that shown in FIGS. 3–5. Analytic signal generator 32 receives an information signal m, and outputs the amplitude |A| of the analytic signal $A = m + j\hat{m}$ at 62 and the argument of A along line 64. The generator 40B also includes a DC bias 48 and an inverter 60. The amplitude of A is fed along line 66 to one arm of the modulator 10 and inverted by inverter 60 on line 68 and fed into the other arm of modulator 10. The interaction of the amplitude modulation on the external modulator output and the phase modulation produces a single or vestigial sideband signal depending on the nature of the modulating signal.

For FIG. 6 the modulating signal applied to the Mach Zehnder modulator 10 is given by |A|. In this case no square scaling is required since the Mach Zehnder modulator is an electric field modulating device. The inverse of the information signal to the second modulator arm ensures that the final output from the Mach Zehnder modulator is chirp free and contains only amplitude modulation. Additionally a suitable bias is applied at bias T 48 to the Mach Zehnder modulator 10 such that a constant phase shift between the modulator arms at the optical carrier wavelength is achieved. The phase modulation is given by arg(A).

This arrangement yields a slightly different single sideband spectrum since the amplitude modulating characteristics of the Mach Zehnder modulator 10 are different form those of the laser diode. The complex envelope output from the device in FIG. 6 is given by $$\text{Cos}(|A|+V_{bias})\exp(\text{jarg}(A)) \tag{15}.$$

The device shown in FIG. 7 is a variation of the device in FIG. 6 in which the amplitude signal is the information signal rather than the envelope of the analytic signal. The information signal is fed along line 70 to lines 66 and 68, but otherwise the device of FIG. 7 has the same components as the device of FIG. 6. The output complex envelope is given by $$\text{Cos}(m+V_{bias})\exp(\text{jarg}(A)) \tag{16}.$$

The device shown in FIG. 8 is a variation of the devices in FIGS. 6 and 7, in which a Hilbert transformer 38 is used to generate the Hilbert transform $\hat{m}$ of the information signal, which is output along line 64 to the phase modulator 42A. The generator 40B is the same as the generator 40B shown in FIG. 7. The output complex envelope is given by $$\text{Cos}(m+V_{bias})\exp(j\hat{m}) \tag{17}.$$

None of the structures in FIGS. 6–8 will give ideal performance since the Mach Zehnder modulator 10 is a non linear device. If however the modulation voltage is kept small relative to the required extinction voltage of the Mach Zehnder modulator 10, good approximations to signal sideband signal will be achievable. Additionally, predistortion may be applied to the phase modulator signal to reflect the distortion introduced by the Mach-Zehnder modulator. This will improve sideband cancellation at the output of the phase modulator.

Figure 16:
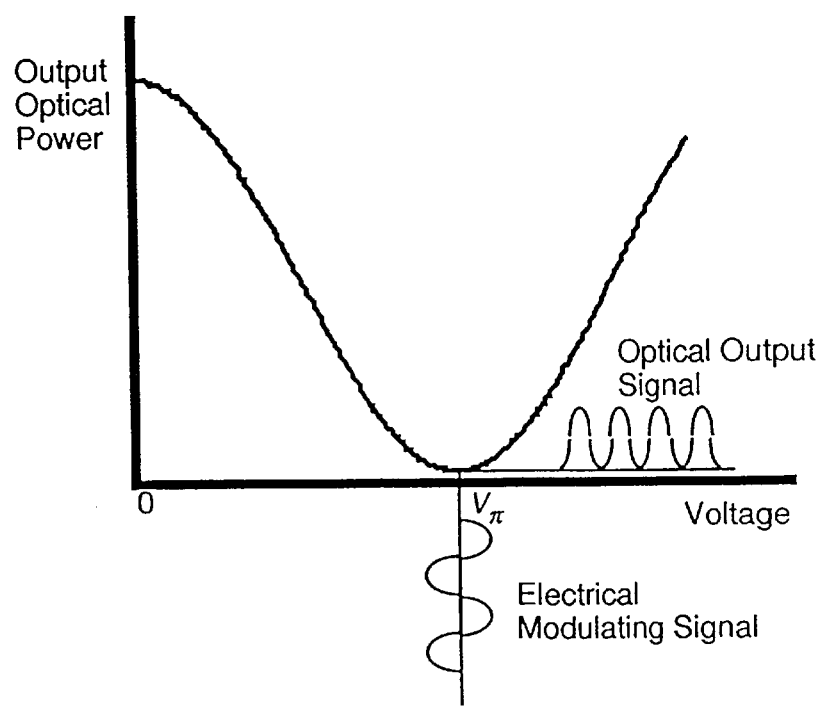
FIG. 16 is a schematic drawing showing the operating characteristics of a Mach-Zehnder modulator biased at quadrature to yield harmonic upconversion of the applied modulating signal.
Figure 17:
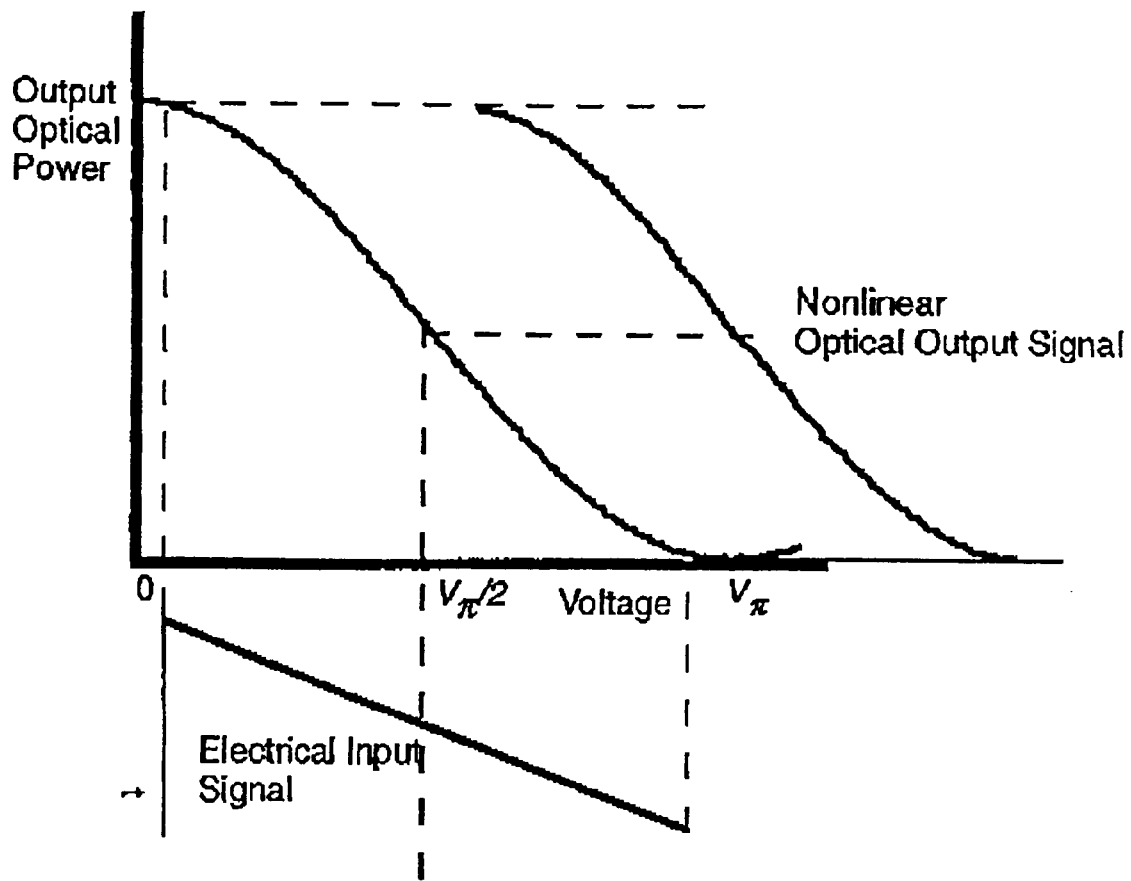
FIG. 17 is a schematic drawing showing the operating characteristics of a Mach-Zehnder modulator biased for linear operation but overdriven to yield nonlinear operation and permit harmonic upconversion of the applied modulation signal.

To achieve harmonic upconversion in the external amplitude/phase modulator structures in FIGS. 6–8, firstly the external amplitude modulator is driven in a nonlinear fashion as shown in FIGS. 16 and 17. As in the laser/phase structure, this has the effect of producing harmonics of the input signal at frequency offsets from the optical carrier that are integer multiples of the input fundamental frequency. The phase modulator 42A produces harmonics in the same manner as outlined for the modulators in FIGS. 3–5. When the optical signal is detected these shifted optical components emerge as frequency upconverted versions of the subcarrier modulation signal applied to the optical modulator. To achieve simultaneous harmonic upconversion and sideband cancellation in the structures of FIGS. 6–8 the drive level and/or bias voltage to the external amplitude modulator 10 and the drive level to the phase modulator 42A are adjusted so as to produce harmonics by the above mechanisms. The interactions of the respective higher harmonics of the input signal interact in the same fashion as in subcarrier modulation so as to mutually cancel sidebands at specific harmonic offsets from the optical carrier. This type of modulation is only effective on subcarrier type input signals.

Figure 9:
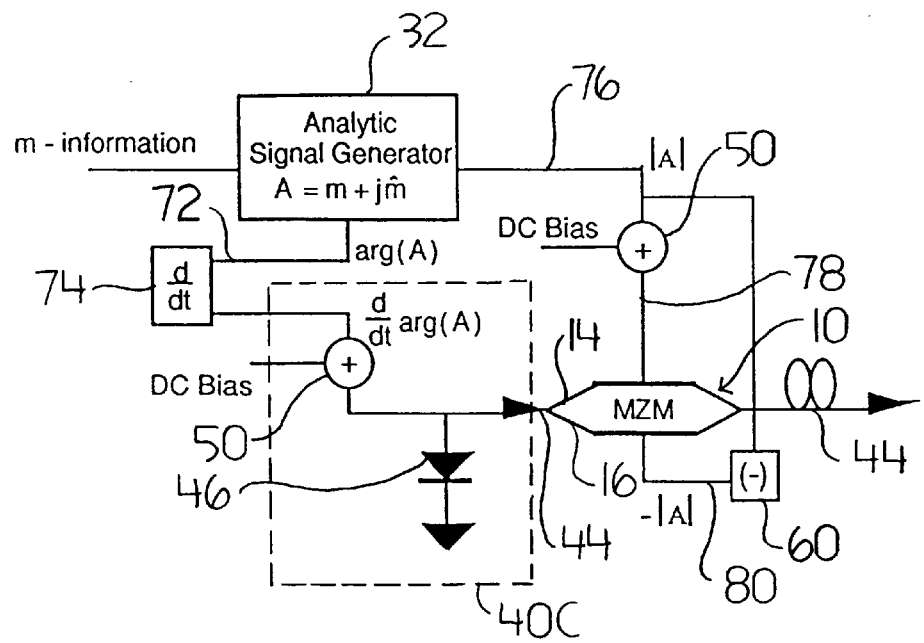
FIG. 9 is a schematic drawing of an optical single sideband modulator in accordance with the invention that employs a cascade of a laser diode frequency modulator and a Mach Zehnder type external optical amplitude modulator. The laser modulation signal is the mathematical first time derivative of the argument of the analytic signal associated with the information signal m. The amplitude modulation signal is the envelope of the analytic signal associated with the information signal m.
Figure 10:
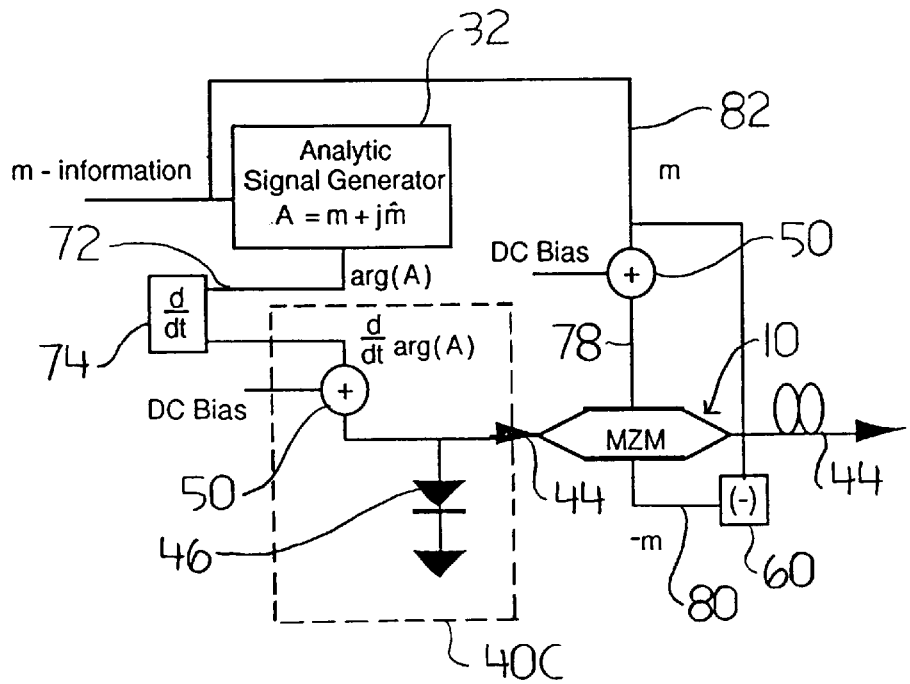
FIG. 10 is a schematic drawing of an optical single sideband modulator in accordance with the invention that employs a cascade of a laser diode frequency modulator and a Mach Zehnder type external optical amplitude modulator. The laser modulation signal is the mathematical first time derivative of the argument of the analytic signal associated with the information signal m. The amplitude modulation signal is the information signal m.
Figure 11:
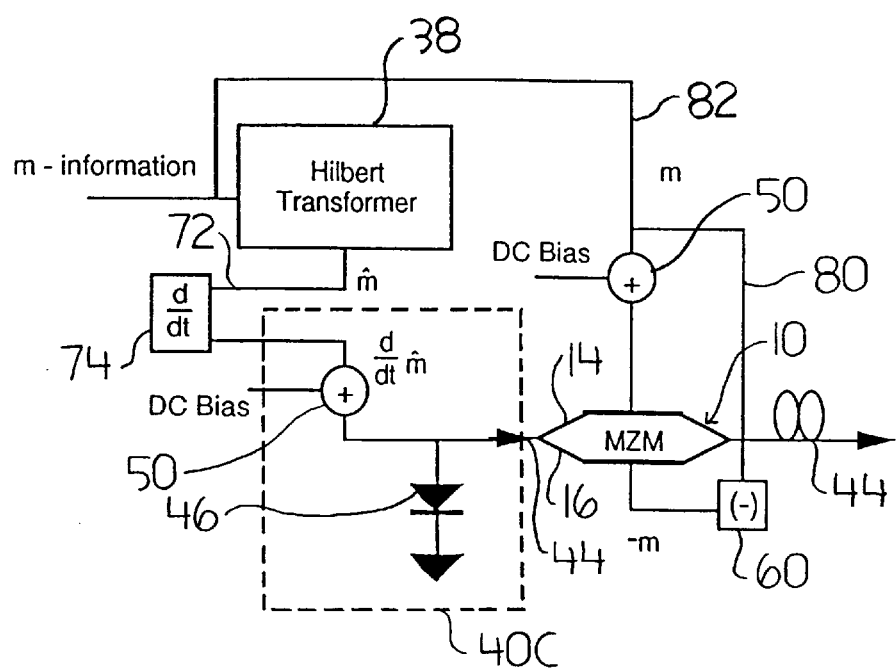
FIG. 11 is a schematic drawing of an optical single sideband modulator in accordance with the invention that employs a cascade of a laser diode frequency modulator and a Mach Zehnder type external optical amplitude modulator. The laser modulation signal is the mathematical first time derivative of the Hilbert Transform of the information signal m. The amplitude modulation signal is the information signal m.

In FIGS. 9–11, frequency modulated laser diodes are used for the generator 40C. In FIG. 9, an analytic signal generator 32 operates on an input information signal to generate an analytic signal A. The argument of A is fed along line 72, time differentiated in differentiator 74 and input to the generator 40C, which here is formed by a laser diode 46 and bias tee 50. Output from the generator 40C is output along optical guide 44 on which is a Mach-Zehnder modulator 10 having two arms 14, 16. The Mach-Zehnder modulator 10 is modulated by the amplitude of A output along line 76 from analytic signal generator 32. +|A| is fed along line 78 through bias tee 50 to one arm 14 of the modulator 10, while −|A| is fed along line 80 to the other arm 16 of the modulator 10. The structure of FIG. 9 achieves the same qualitative effect as the structures in FIGS. 3–8 except that the phase modulation is applied to the laser diode 40C as an FM signal and the amplitude modulation is imposed on the optical carrier by the Mach-Zehnder modulator 10 after phase modulation. In this embodiment tae modulating signal to the laser is given by $$d\hat{m}/dt; \text{ or } d\text{arg}(A)/dt \tag{18}$$

The time derivative of the Hilbert Transform of the information signal or the argument of the analytic signal is required since the mechanism that is exploited to achieve phase modulation in the laser diode 46 is the laser chirp characteristic. Laser chirp may be approximately modeled as a linear FM modulation that is imposed onto the optical electric field that is emitted from a laser diode, Since the frequency of a signal is simply the time derivative of the time varying phase of a signal, phase modulation may be achieved by frequency modulating the optical signal with the time derivative of the desired phase modulating signal. There will, in the case of a laser diode, also be a contamination of the amplitude of the laser diode output. FIG. 9 shows a modulator structure in which the laser is modulated with the time derivative of the argument of the analytic signal and the envelope of the analytic signal is applied to the external modulator. The normalized output is given by $$(1+kd)\cdot\text{Cos}(|A|+V_{bias})\exp(\text{jarg}(A)) \tag{19}$$

where d is a normalized distortion term given by $$d(t)=\surd(d\hat{m}/dt) \text{ or } \surd(d\text{arg}(A)/dt) \tag{20}$$

and where the constant k determines the amount of amplitude contamination from the laser diode.

FIG. 10 shows a variation of the structure in FIG. 9 with the information signal fed along line 82 to the amplitude modulator 10. Otherwise, the structure of the device in FIG. 10 is the same as that shown in FIG. 9. In this case the output complex envelope is given by $$(1+kd)\cdot\text{Cos}(m+V_{bias})\exp(\text{jarg}(A)) \tag{21}$$

FIG. 11 shows a variation of the structure in FIG. 10 with the Hilbert Transform of the information signal as the laser modulation signal. The structure of FIG. 11 is the same as that of FIG. 10, except the analytic signal generator 32 has been replaced by a Hilbert transformer 38, and the Hilbert transform $\hat{m}$ is fed along line 72 to the differentiator 74. The output complex envelope of the optical electric field is given by $$(1+kd)\cdot\text{Cos}(m+V_{bias})\exp(j\hat{m}) \tag{22}$$

A compensating signal of the form $$m_c(t)=-\surd[dtm_p(t)/dt] \tag{23}$$

may be applied to the external modulator to offset the effect of amplitude contamination from the laser modulation. In any case, if the constant term k in (19–23) is small, good approximations to signal sideband signal will result.

For harmonic upconversion in the laser frequency/external amplitude modulator structures in FIGS. 9–11, the laser is not driven into the clipping range. Rather the device is modelled as a standard phase modulator with inherently nonlinear characteristics with associated harmonic replication of the input fundamental frequency. The external amplitude modulator is driven to the point of nonlinear operation as shown in FIG. 17 or the bias of the external modulator is set so that the device is inherently nonlinear as in FIG. 16. This has the effect of producing harmonics of the input signal at frequency offsets from the optical carrier that are integer multiples of the input fundamental frequency. The phase modulator produces harmonics in the same manner as described for FIGS. 3–8. When the optical signal is detected these shifted optical components emerge as frequency upconverted versions of the subcarrier modulation signal applied to the optical modulator. To achieve simultaneous harmonic upconversion and sideband cancellation in the structures of FIGS. 9–11 the drive level and/or bias voltage to the external amplitude modulator and the drive level of the laser frequency modulator are adjusted so as to produce harmonics by the above mechanisms. The interactions of the respective higher harmonics are similar to the fundamental frequency components with respect to cancellation of sidebands at specific harmonic offsets form the optical carrier. Again, this type of modulation is only effective on subcarrier type input signals.

As will be appreciated by a person skilled in the art, scaling of the amplitude or intensity modulated signal and the phase modulated signal may be required in order to produce maximum suppression of the unwanted signal sideband.

While the method and apparatus has been described within the context of a preferred embodiment, it is not intended to limit the scope of the invention to the form set forth. For example, various modulators may be used to implement the cascade of phase and amplitude modulation. A person skilled in the art could make immaterial modifications to the invention described in this patent document without departing from the essence of the invention that is intended to be covered by the scope of the claims that follow.

What is claimed is:

1. An optical signal modulation system for modulating an optical carrier, the system comprising:

an amplitude modulated laser diode forming a generator of a modulated optical signal having a finite transmission bandwidth;

an optical light guide connected to receive a modulated optical signal from the generator:

a phase modulator for modulating optical signals carried by the optical light guide, the modulator being cascaded with the generator;

an analytic signal generator for generating a complex analytic signal A, having a magnitude and argument, from an information signal m;

the analytic signal generator being connected to the generator to intensity modulate the power of the optical carrier with the square of the magnitude of A; and the analytic signal generator being connected to the phase modulator to phase modulate the optical carrier with the argument of A;

whereby optical signals generated by the optical modulation system have a single sideband.

2. An optical signal modulation system for modulating an optical carrier, the system comprising:

an amplitude modulated laser diode forming a generator of a modulated optical signal having a finite transmission bandwidth;

an optical light guide connected to receive a modulated optical signal from the generator;

a phase modulator for modulating optical signals carried by the optical light guide, the modulator being cascaded with the generator;

an analytic signal generator for generating a complex analytic signal A, having an argument, from an information signal m;

the generator being connected to receive the information signal squared for intensity modulating the power of the optical carrier with the information signal squared; and the analytic signal generator being connected to the phase modulator to phase modulate the optical carrier with the argument of A;

whereby optical signals generated by the optical signal modulation system are characterized by having one of a single sideband and a vestigial sideband.

3. An optical signal modulation system for modulating an optical carrier, the system comprising:

an amplitude modulated laser diode forming a generator of a modulated optical signal having a finite transmission bandwidth;

an optical light guide connected to receive a modulated optical signal from the generator;

a phase modulator for modulating optical signals carried by the optical light guide, the modulator being cascaded with the generator;

a Hilbert transformer for generating a Hilbert transform from an information signal m;

the generator being connected to receive the information signal squared for intensity modulating the power of the optical carrier with the information signal squared; and the Hilbert transformer being connected to the phase modulator to phase modulate the optical carrier with the Hilbert transform;

whereby optical signals generated by the optical signal modulation system are characterized by having one of a single sideband and a vestigial sideband.

4. An optical signal modulation system for modulating an optical carrier, the system comprising:

a laser diode followed by an amplitude modulator together forming a generator of a modulated optical signal having a finite transmission bandwidth;

an optical light guide connected to receive a modulated optical signal from the generator;

a phase modulator for modulating optical signals carried by the optical light guide, the modulator being cascaded with the generator;

an analytic signal generator for generating a complex analytic signal A, having a magnitude and argument, from an information signal m;

the analytic signal generator being connected to the generator to amplitude modulate the amplitude of the optical carrier with the magnitude of A; and the analytic signal generator being connected to the phase modulator to phase modulate the optical carrier with the argument of A;

whereby optical signals generated by the optical modulation system have a single sideband.

5. The optical modulation system of claim 4 in which the amplitude modulator is a Mach-Zehnder modulator having first and second arms, one of the arms being driven by the positive magnitude of A and the other being driven by the negative magnitude of A.

6. An optical signal modulation system for modulating an optical carrier, the system comprising:

a laser diode followed by an amplitude modulator together forming a generator of a modulated optical signal having a finite transmission bandwidth;

an optical light guide connected to receive a modulated optical signal from the generator;

a phase modulator for modulating optical signals carried by the optical light guide, the modulator being cascaded with the generator;

an analytic signal generator for generating a complex analytic signal A, having an argument, from an information signal m;

the generator being connected to receive the information signal for modulating the amplitude of the optical carrier with the information signal; and the analytic signal generator being connected to the phase modulator to phase modulate the optical carrier with the argument of A;

whereby optical signals generated by the optical signal modulation system are characterized by having one of a single sideband and a vestigial sideband.

7. The optical modulation system of claim 6 in which the amplitude modulator is a Mach-Zehnder modulator having first and second arms, one of the arms being driven by the information signal and the other being driven by the negative of the information signal.

8. An optical signal modulation system for modulating an optical carrier, the system comprising:

a laser diode followed by an amplitude modulator together forming a generator of a modulated optical signal having a finite transmission bandwidth;

an optical light guide connected to receive a modulated optical signal from the generator;

a phase modulator for modulating optical signals carried by the optical light guide, the modulator being cascaded with the generator;

a Hilbert transformer for generating a Hilbert transform from an information signal m;

the generator being connected to receive the information signal for modulating the amplitude of the optical carrier with the information signal; and the Hilbert transformer being connected to the phase modulator to phase modulate the optical carrier with the Hilbert transform;

whereby optical signals generated by the optical signal modulation system are characterized by having one of a single sideband and a vestigial sideband.

9. The optical modulation system of claim 8 in which the amplitude modulator is a Mach-Zehnder modulator having first and second arms, one of the arms being driven by the information signal and the other being driven by the negative of the information signal.

10. An optical signal modulation system for modulating an optical carrier, the system comprising:

a laser diode forming a generator of a modulated optical signal having a finite transmission bandwidth;

an optical light guide connected to receive a modulated optical signal from the generator;

an amplitude modulator for modulating optical signals carried by the optical light guide, the modulator being cascaded with the generator;

an analytic signal generator for generating a complex analytic signal A, having an amplitude and argument, from an information signal m;

the analytic signal generator being connected to the amplitude modulator to amplitude modulate the optical carrier with the magnitude of A; and the analytic signal generator being connected to the laser diode to phase modulate the optical carrier with the argument of A, whereby optical signals generated by the optical modulation system have a single sideband.

11. The optical modulation system of claim 10 further comprising a differentiator connected to receive and differentiate the argument of the analytic signal A and output the differentiated argument of the analytic signal A to the laser diode.

12. The optical modulation system of claim 10 in which the amplitude modulator is a Mach-Zehnder modulator having first and second arms, one of the arms being driven by the magnitude of A and the other being driven by the negative of the magnitude of A.

13. An optical signal modulation system for modulating an optical carrier, the system comprising:

a laser diode forming a generator of a modulated optical signal having a finite transmission bandwidth;

an optical light guide connected to receive a modulated optical signal from the generator;

an amplitude modulator for modulating optical signals carried by the optical light guide, the modulator being cascaded with the generator;

an analytic signal generator for generating a complex analytic signal A, having an argument, from an information signal m;

the amplitude modulator being connected to receive the information signal for amplitude modulating the optical carrier with the information signal; and the analytic signal generator being connected to the laser diode to phase modulate the optical carrier with the argument of A;

whereby optical signals generated by the optical signal modulation system are characterized by having one of a single sideband and a vestigial sideband.

14. The optical modulation system of claim 13 further comprising a differentiator connected to receive and differentiate the argument of the analytic signal A and output the differentiated argument of the analytic signal A to the laser diode.

15. The optical modulation system of claim 13 in which the amplitude modulator is a Mach-Zehnder modulator having first and second arms, one of the arms being driven by the information signal m and the other being driven by the negative of the information signal m.

16. An optical signal modulation system for modulating an optical carrier, the system comprising:

a laser diode forming a generator of a modulated optical signal having a finite transmission bandwidth;

an optical light guide connected to receive a modulated optical signal from the generator;

an amplitude modulator for modulating optical signals carried by the optical light guide, the modulator being cascaded with the generator;

a Hilbert transformer for generating a Hilbert transformm from an information signal m;

the amplitude modulator being connected to receive the information signal for amplitude modulating the optical carrier with the information signal; and the Hilbert transformer being connected to the laser diode to phase modulate the optical carrier with the Hilbert transform;

whereby optical signals generated by the optical signal modulation system are characterized by having one of a single sideband and a vestigial sideband.

17. The optical modulation system of claim 16 further comprising a differentiator connected to receive and differentiate the Hilbert Transform of the information signal and output the differentiated Hilbert Transform of the information signal to the laser diode.

18. The optical modulation system of claim 16 in which the amplitude modulator is a Mach-Zehnder modulator having first and second arms, one of the arms being driven by the information signal m and the other being driven by the negative of the information signal m.

19. A method of generating a modulated optical signal to be transmitted along an optical waveguide, the modulated optical signal having a transmission bandwidth, the method comprising the steps of:

generating a modulated optical signal on an optical light guide with a modulated optical signal generator, in which the optical signal is modulated by one of an amplitude modulator and a phase modulator;

subsequently modulating the modulated optical signal carried by the optical light guide, in which the optical signal is modulated by the other of an amplitude modulator and a phase modulator; and modulation signals for the amplitude modulator and the phase modulator being selected such that the optical signal has a single sideband.

20. A method of generating a modulated optical signal to be transmitted along an optical waveguide, the modulated optical signal having a transmission bandwidth, the method comprising the steps of:

generating a modulated optical signal on an optical light guide with a modulated optical signal generator, in which the optical signal is amplitude modulated by an amplitude modulator signal, and the amplitude modulation signal is selected from the group consisting of the amplitude of an information signal and the amplitude of an analytic information signal;

subsequently modulating the modulated optical signal carried by the optical light guide, in which the optical signal is modulated by a phase modulator; and modulation signals for the amplitude modulator and the phase modulator being selected such that the optical signal are characterized by having one of a vestigial sideband and a single sideband;

in which the modulated optical signal generator comprises a laser diode having a clipping region, and the laser diode is driven into the clipping region with a subcarrier information signal, whereby harmonics of the subcarrier information signal are generated at frequency offsets from the optical signal that are integer multiples of the frequency of the subcarrier information signal.

21. A method of generating a modulated optical signal to be transmitted along an optical waveguide, the modulated optical signal having a transmission bandwidth, the method comprising the steps of:

generating a modulated optical signal on an optical light guide with a modulated optical signal generator, in which the optical signal is modulated by a phase modulation signal;

the phase modulation signal being selected from the group consisting of the time derivative of the argument of an analytic information signal and the time derivative of the Hilbert transform of an information signal;

subsequently modulating the modulated optical signal carried by the optical light guide, in which the optical signal is modulated by an amplitude modulator; and modulation signals for the amplitude modulator and the phase modulator being selected such that the optical signal has a single sideband.

22. The method of claims 21 in which the amplitude modulator is operated to produce harmonics of a subcarrier information signal modulated onto the optical signal, whereby harmonics of the subcarrier information signal are generated at frequency offsets from the optical signal that are integer multiples of the frequency of the subcarrier information signal.

23. A method of generating a modulated optical signal to be transmitted along an optical waveguide, the modulated optical signal having a transmission bandwidth, the method comprising the steps of:

generating a modulated optical signal on an optical light guide with a modulated optical signal generator, in which the optical signal is modulated by one of an amplitude modulator and a phase modulator;

subsequently modulating the modulated optical signal carried by the optical light guide, in which the optical signal is modulated by the other of an amplitude modulator and a phase modulator;

modulation signals for the amplitude modulator and the phase modulator being selected such that the optical signal is characterized by having one of a single sideband and vestigial sideband; and the amplitude modulator being operated non-linearly to produce harmonics of a subcarrier information signal modulated onto the optical signal.

24. The method of claim 23 in which the amplitude modulator is a Mach-Zehnder modulator operated at its quadrature bias point.

25. A method of generating a modulated optical signal to be transmitted along an optical waveguide, the modulated optical signal having a transmission bandwidth, the method comprising the steps of:

generating a modulated optical signal on an optical light guide with a modulated optical signal generator, in which the optical signal is modulated by one of an amplitude modulator and a phase modulator, a baseband information signal being applied to the generator to modulate the optical signal;

subsequently modulating the modulated optical signal carried by the optical light guide, in which the optical signal is modulated by the other of an amplitude modulator and a phase modulator; and modulation signals for the amplitude modulator and the phase modulator being selected such that the optical signal is characterized by having one of a single sideband and vestigial sideband.

26. A method of generating a modulated optical signal to be transmitted along an optical waveguide, the modulated optical signal having a transmission bandwidth, the method comprising the steps of:

generating a modulated optical signal on an optical light guide with a modulated optical signal generator, in which the optical signal is modulated by one of an amplitude modulator and a phase modulator, a subcarrier information signal being applied to the generator to modulate the optical signal;

subsequently modulating the modulated optical signal carried by the optical light guide, in which the optical signal is modulated by the other of an amplitude modulator and a phase modulator; and modulation signals for the amplitude modulator and the phase modulator being selected such that the optical signal is characterized by having one of a single sideband and vestigial sideband.

* * * * *